US011451268B2

(12) United States Patent
Radi et al.

(10) Patent No.: US 11,451,268 B2
(45) Date of Patent: Sep. 20, 2022

(54) DEVICE AND METHOD FOR TRAINING A MODEL

(71) Applicant: Technische Universitat Dresden, Dresden (DE)

(72) Inventors: Mohammed Radi, Dresden (DE); Emil Matus, Dresden (DE); Gerhard Fettweis, Dresden (DE)

(73) Assignee: Technische Universitat Dresden, Dresden (DE)

( * ) Notice: Subject to any disclaimer, the term of this patent is extended or adjusted under 35 U.S.C. 154(b) by 89 days.

(21) Appl. No.: 17/092,818

(22) Filed: Nov. 9, 2020

(65) Prior Publication Data
US 2021/0184734 A1 Jun. 17, 2021

(30) Foreign Application Priority Data

Dec. 12, 2019 (EP) .................................. 19 215 707

(51) Int. Cl.
*H04B 7/0413* (2017.01)
*G06K 9/62* (2022.01)
*G06N 3/02* (2006.01)
*H04L 27/26* (2006.01)

(52) U.S. Cl.
CPC ......... *H04B 7/0413* (2013.01); *G06K 9/6256* (2013.01); *G06K 9/6267* (2013.01); *G06N 3/02* (2013.01); *H04L 27/2647* (2013.01)

(58) Field of Classification Search
CPC .. H04B 7/0413; G06K 9/6256; G06K 9/6267; G06N 3/02; H04L 27/2647

USPC .......................................... 370/351, 389, 392
See application file for complete search history.

(56) References Cited

U.S. PATENT DOCUMENTS

| | | | | |
|---|---|---|---|---|
| 2016/0248610 | A1* | 8/2016 | Vaman | H04L 25/03159 |
| 2019/0065989 | A1* | 2/2019 | Kida | G06N 3/0481 |
| 2020/0285898 | A1* | 9/2020 | Dong | G06N 3/08 |
| 2020/0321118 | A1* | 10/2020 | Kim | G16H 30/20 |

FOREIGN PATENT DOCUMENTS

WO 2006/001288 A1 1/2006

OTHER PUBLICATIONS

Extended European Search Report issued in European Patent Application No. 19215707.1, date of completion of search Jun. 22, 2020.
(Continued)

*Primary Examiner* — Obaidul Huq
(74) *Attorney, Agent, or Firm* — Barnes & Thornburg LLP; Jeffrey R. Stone

(57) ABSTRACT

A device and a method for training a model are disclosed, wherein the method of training the model includes: first classifying a plurality of data packets using the model, wherein a first class is assigned to each data packet of a plurality of data packets, wherein the first class is associated with a receiver of a plurality of receivers; second classifying the plurality of data packets, wherein a second class is assigned to each data packet of the plurality of data packets, wherein the second class is associated with a receiver of the plurality of receivers; and training the model using the plurality of first classes and the plurality of second classes assigned to the plurality of data packets.

15 Claims, 8 Drawing Sheets

(56) References Cited

OTHER PUBLICATIONS

Low et al. "Interference Modulation Order Detection with Supervised Learning for LTE Interference Cancellation", 2015 IEEE 82nd Vehicular Technology Conference (VTC2015-fall), IEEE, Sep. 6, 2015 (Sep. 6, 2015), pp. 1-5, XP032857160.
Neev et al. "Deep MIMO Detection", arxiv.org, cornell University Library, 201 Olin Library Cornell University Ithace, NY 14853, Jun. 4, 2017 (Jun. 4, 2017), XP080767452.
Hauser, Steven C., et al., "Real-World Considerations for Deep Learning in Spectrum Sensing", Thesis submitted to the Faculty of the Virginia Polytechnic Institute and State University in partial fulfillment of the requirements for the degree of Master of Science in Electrical Engineering, May 7, 2018, 113 pages.
Kulin, Marima, et al., "End-to-End Learning From Spectrum Data A Deep Learning Approach for Wireless Signal Identification in Speclium Monitoring Applications", IEEE Access, vol. 6, 2018, Published Mar. 26, 2018, pp. 19484-18501.

* cited by examiner

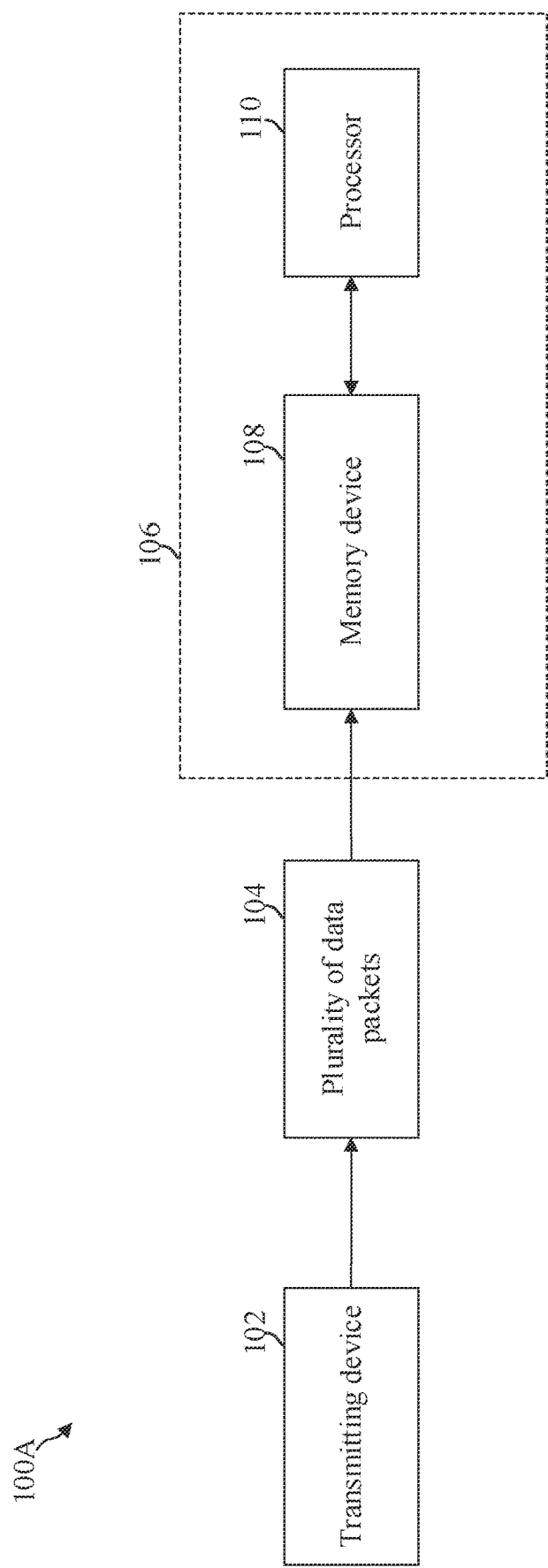

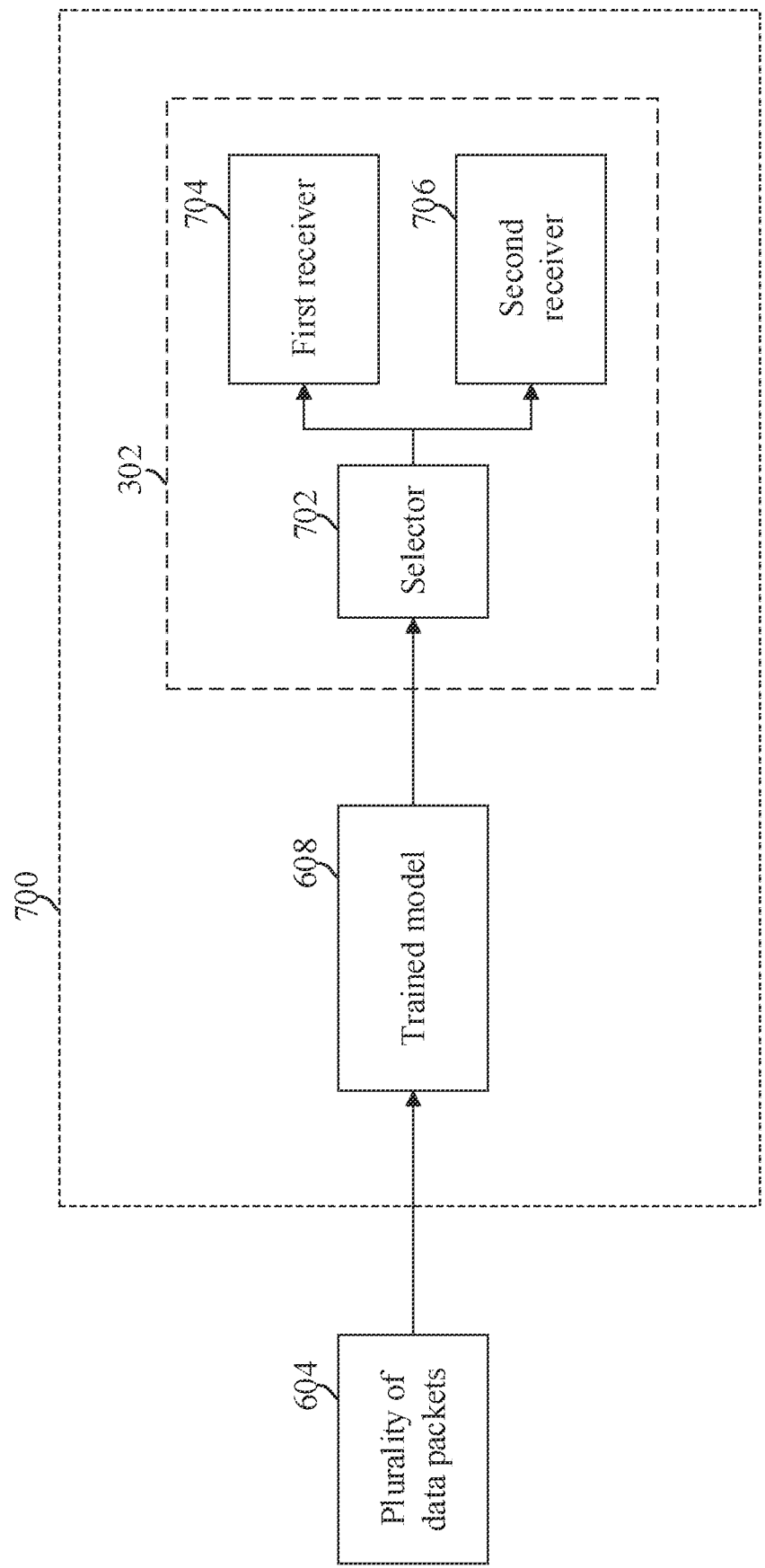

DEVICE AND METHOD FOR TRAINING A MODEL

Various embodiments generally relate to a device and a method for training a model.

By way of example, in wireless communication, data packets or data blocks are generated by a transmitter and transmitted wirelessly through a communication channel to a receiving device including a plurality of receivers, wherein the complexity of the architecture of each receiver may vary and wherein each data packet may require a minimum complexity of a receiver architecture depending on the features of the respective data packet. Thus, it may be necessary to provide a system capable of selecting a receiver (i.e. a receiver architecture) for a respective data packet depending on the features of the data packet.

A method of computer-implemented training a model may include: first classifying a plurality of data packets using the model, wherein a first class is assigned to each data packet of a plurality of data packets, wherein the first class is associated with a receiver of a plurality of receivers; second classifying the plurality of data packets, wherein a second class is assigned to each data packet of the plurality of data packets, wherein the second class is associated with a receiver of the plurality of receivers; and training the model using the plurality of first classes and the plurality of second classes assigned to the plurality of data packets. The method mentioned in this paragraph provides a first example.

The method enables a model to be trained to select a receiver for a data packet depending on the features of the data packet.

A model may be any kind of algorithm, which provides output data for input data. A model may be a differential model. For example, a model may be a support vector machine or a neural network, such as forward thinking neural network or a sum-product neural network.

The plurality of data packets may include communication data. The feature mentioned in this paragraph in combination with the first example provides a second example.

Each data packet of the plurality of data packets may include IQ data. The feature mentioned in this paragraph in combination with the first example or the second example provides a third example.

Each receiver of the plurality of receivers may include a complexity level of a plurality of complexity levels. The feature mentioned in this paragraph in combination with any one of the first example to the third example provides a fourth example.

Each data packet of the plurality of data packets may require a receiver of the plurality of receivers with a minimum complexity level to be processed without an error. The feature mentioned in this paragraph in combination with the fourth example provides a fifth example.

The second classifying may include processing each data packet of the plurality of data packets using the plurality of receivers. The second classifying may further include assigning to each data packet of the plurality of data packets the second class associated to a receiver of the plurality of receivers including the minimum complexity level. The features mentioned in this paragraph in combination with the fifth example provide a sixth example.

Each data packet of the plurality of data packets may be processed using the plurality of receivers successively starting with the receiver including the lowest complexity level and continuing with the receiver including the next lowest complexity level until a receiver of the complexity of receivers processes the respective data packet without an error. The complexity of the receiver, which processes the respective data packet without an error, may be the minimum complexity level. The features mentioned in this paragraph in combination with the sixth example provide a seventh example.

Training the model may include adapting the model by comparing the first class with the second class assigned to each data packet of the plurality of data packets. The feature mentioned in this paragraph in combination with any one of the first example to the seventh example provides an eighth example.

Training the model may further include adapting the model such that the first class assigned to each data packet of the plurality of data packets corresponds to the second class. The feature mentioned in this paragraph in combination with the eighth example provides a ninth example.

The model may be a neural network. The feature mentioned in this paragraph in combination with any one of the first example to the ninth example provides a tenth example.

A receiving device may be configured to perform the method of any one of the first example to the tenth example. The receiving device mentioned in this paragraph provides an eleventh example.

A data reception method may include classifying a plurality of data packets using a model, wherein the model may be trained by the method of any one of the first example to the tenth example, wherein a class may be assigned to each data packet of the plurality of data packets and wherein the class may be associated with a receiver of a plurality of receivers. The assigned class may be associated to the receiver including a minimum complexity level required to process the respective data packet. The data reception method may further include processing each data packet of the plurality of data packets using the receiver of the plurality of receivers associated to the respective class of the plurality of classes. This has the advantage that a data packet is processed by a most appropriate receiver in terms of capability and least complexity. In other words, a data packet is neither processed stage-wise starting with the receiver having the lowest complexity until a receiver is capable of processing the data packet nor are the data packets processed by a high complexity receiver if the data packet does not require the high complexity receiver. Thus, this has the advantage of reducing the processing cost and the power consumption. Hence, it is an aspect of various embodiments to provide a receiving device capable of reducing the power consumption necessary for processing (for example decoding) data packets. Another advantage of the data reception method is that a combination of low complexity receivers and high complexity receivers can be used while the performance is the same as for high complexity receivers. The data reception method mentioned in this paragraph provides a twelfth example.

The data reception method may further include estimating a processing time and/or a processing cost based on the classification of the plurality of data packets before processing the plurality of data packets. The feature mentioned in this paragraph in combination with the twelfth example provides a thirteenth example.

A system may include a receiving device including a model trained by the method of any one of the first example to the tenth example. The receiving device may be configured to receive and to process data packets. The system may further include at least one transmitter device configured to transmit data packets to the receiving device. The system mentioned in this paragraph provides a fourteenth example.

The system may be a multiple input multiple output (MIMO) system. The feature mentioned in this paragraph in combination with the fourteenth example provides a fifteenth example.

Various embodiments of the invention are described with reference to the following drawings, in which:

FIG. 1A shows a system according to various embodiments;

FIG. 7 shows a receiving device including a trained model according to various embodiments.

Figure 1B:
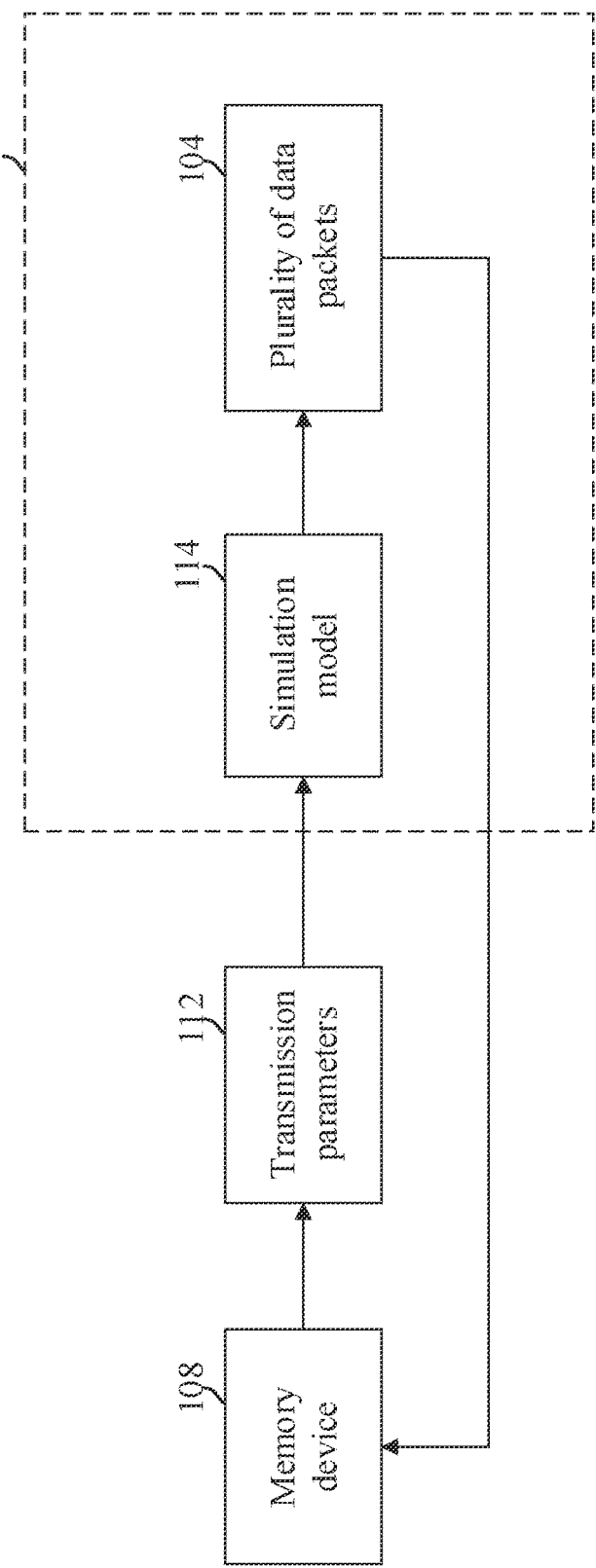
FIG. 1B shows a processing system for generating data packets according to various embodiments.

In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In wireless communication a receiving device may include a plurality of receivers, wherein each receiver may have a different complexity level of the architecture. The receiving device may receive data packets transmitted by a transmitting device, wherein each data packet may require a minimum complexity level of a receiver architecture. Illustratively, a model is trained to select a receiver for a respective data packet depending on the features of the data packet.

FIG. 1A shows a system 100A according to various embodiments. The system 100A may include a transmitting device 102. The transmitting device 102 may be configured to provide a plurality of data packets 104 (i.e. data blocks). The plurality of data packets 104 may include communication data. The plurality of data packets 104 may include IQ-data (or. I/Q data). The transmitting device 102 may be configured to generate the plurality of data packets 104. The system 100A may further include a receiving device 106. The receiving device 106 may be included in a base station. The transmitting device 102 may be configured to provide the plurality of data packets 104 to the receiving device 106. The transmitting device may be configured to transmit the plurality of data packets wirelessly (for example over the air) to the receiving device 106 using a wireless communication channel (for example a radio frequency (RF) communication channel) and the receiving device 106 may be configured to receive the plurality of data packets 106 wirelessly from the transmitting device 102.

The receiving device 106 may include a memory device 108. The memory device 108 may include a memory which is for example used in the processing carried out by a processor. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory). The memory device 108 may be configured to store the plurality of data packets 104 provided by the transmitting device 102. The system 100A may further include at least one processor 110. The at least one processor 110 may be any kind of circuit, i.e. any kind of logic implementing entity, as described above. In various embodiments, the processor 110 may be configured to process the plurality of data packets 104.

FIG. 1B shows a processing system 100B for generating data packets according to various embodiments. The processing system 100B may include the memory device 108. The memory device 108 may store transmission parameters 112. The transmission parameters may include specific transmission features, for example different waveforms, such as orthogonal frequency division multiplex (OFDM) or generalized frequency division multiplex (GFDM) but not limited to them, different modulation types, such as quadrature phase-shift keying (QPSK), binary phase-shift keying (BPSK), quadrature amplitude modulation (QAM), for example 64QAM, etc., different bandwidth, different transmission power levels, different multiple input multiple output (MIMO) scenarios (1×1), (1×2), (2×1), (2×2), (4×4) etc. The transmission parameters may include transmission channel conditions, which may be affected by inter-symbol interference (ISI), inter carrier interference (ICI) and/or inter antenna interference (IAI). The processing system 100B may further include the at least one processor 110. The processor 110 may be configured to process the transmission parameters 112. The processor 110 may be configured to implement at least a part of a simulation model 114. the simulation model 114 may be configured to simulate a plurality of data packets 104 using the transmission parameters 112. The simulation model 114 may be any kind of simulation model (for example a physical model). The simulation model may be any kind of code, which, if implemented by a processor, is capable of simulating data packets. The simulation performed by the simulation model may be a static or a dynamic simulation, a stochastic or deterministic simulation. The memory device 108 may be further configured to store the plurality of data packets 104 generated by the simulation model 114.

Figure 2:
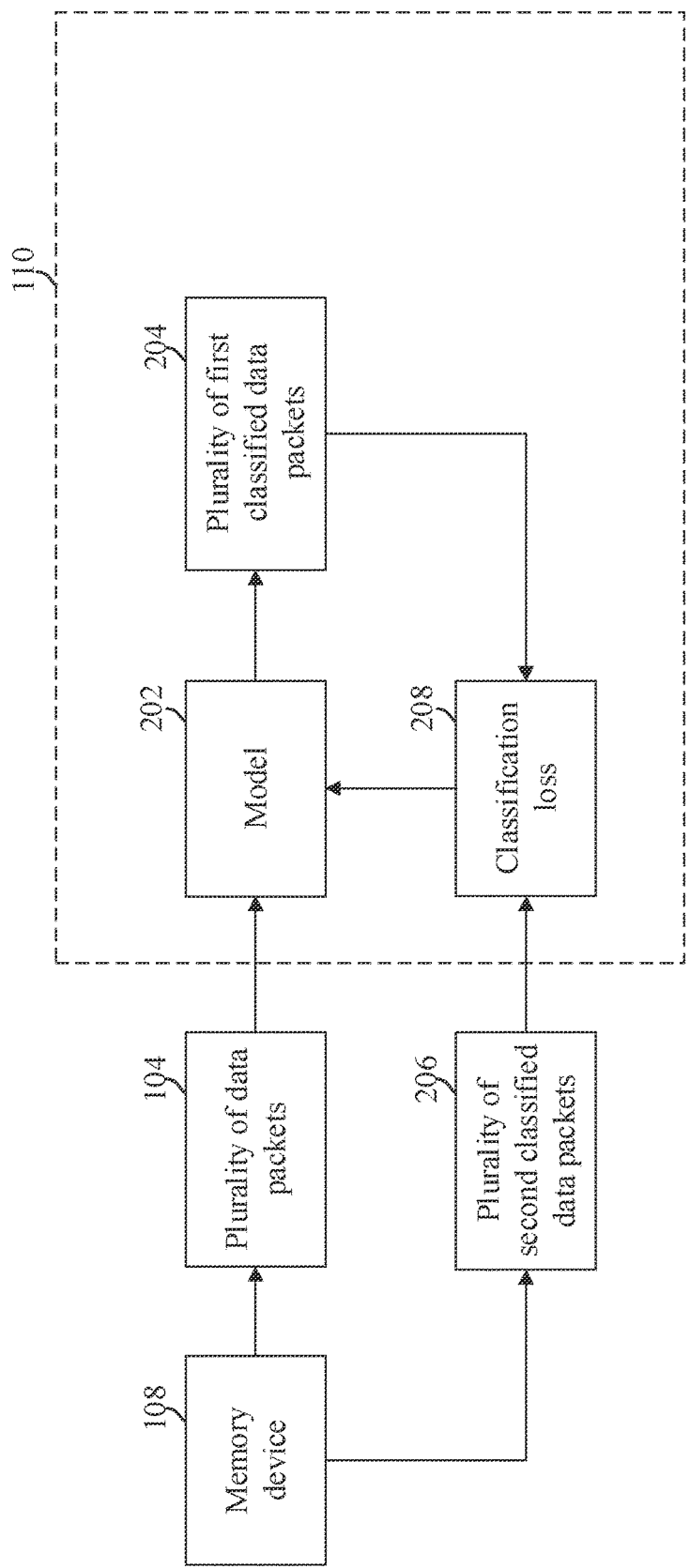
FIG. 2 shows a processing system for training a model according to various embodiments.

FIG. 2 shows a processing system 200 for training a model according to various embodiments. The processing system 200 may include the memory device 108. The memory device 108 may store the plurality of data packets 104, wherein the plurality of data packets may be provided to the memory device 108 using the transmitting device 102 according to the system 100A or using the simulation model 114 according to the processing system 100B. The processing system 200 may further include the at least one processor 110. The at least one processor 110 may be configured to process the plurality of data packets 104. The processor 110 may be configured to implement at least a part of a model 202. The model 202 may be a neural network, wherein the neural network may be any kind of neural network, such as a convolutional neural network, a forward thinking neural network or a sum-product neural network. The neural network may include any number of layers and the training of the neural network, i.e. adapting the layers of the neural network, may be based on any kind of training principle, such as backpropagation, i.e. the backpropagation algorithm. The model 202 may be configured to process the plurality of data packets 104 and may be further configured to provide a plurality of first classified data packets 204. The plurality of first classified data packets 204 may include a first class of a plurality of first classes assigned to each data packet of the plurality of data packets 104. In other words, the plurality of first classified data packets 204 may include each data packet of the plurality of data packets 104 labeled with a first class. Hence, according to various embodiments, the model 202 is configured to classify data packets, such as raw IQ data used in communication. Each first class of the plurality of first classes may be associated with a receiver of a plurality of receivers. In other words, each receiver of a plurality of receivers may be associated to a first class of the plurality of first classes and the model 202 may be configured to assign a first class to each data packet of the plurality of data packets 104.

The memory device 108 may be further configured to store a plurality of second classified data packets 206. The plurality of second classified data packets 206 may include a second class of a plurality of second classes assigned to each data packet of the plurality of data packets 104. In other words, the plurality of second classified data packets 206 may include each data packet of the plurality of data packets 104 labeled with a second class. Each second class of the plurality of second classes may be associated with a receiver of a plurality of receivers. In other words, each receiver of a plurality of receivers may be associated to a second class of the plurality of second classes. The plurality of second classified data packets 206 may be training data used for training the model 202. Thus, the memory device 108 may be configured to store the training data used for training the model 202. The processor 110 may be further configured to determine a classification loss 208. The classification loss 208 may be determined using the plurality of first classified data packets 204 and the plurality of second classified data packets 206. The classification loss 208 may be determined by comparing the first class assigned to each data packet of the plurality of data packets 104, i.e. the plurality of first classified data packets 204, with the second class assigned to each data packet of the plurality of data packets 104, i.e. the plurality of second classified data packets 206. The processor 110 may be configured to adapt the model 202 using the classification loss 208. The processor 110 may be configured to adapt the model 202 such that the plurality of first classified data packets 204 generated by the model 202 corresponds to the plurality of second classified data packets 206. In other words, the model 202 may be adapted such that the first class assigned to each data packet of the plurality of data packets 104 by the model 202 corresponds to the second class assigned to each data packet. In even other words, the model 202 learns to assign a first class to a data packet, which corresponds to the second class assigned to the respective data packet. Illustratively, the model 202 learns to assign a class, which is associated with a receiver, to a data packet considering the data packet parameters, such as properties of a transmitted data pattern and channel characteristics, and considering receiver algorithms.

Figure 3:
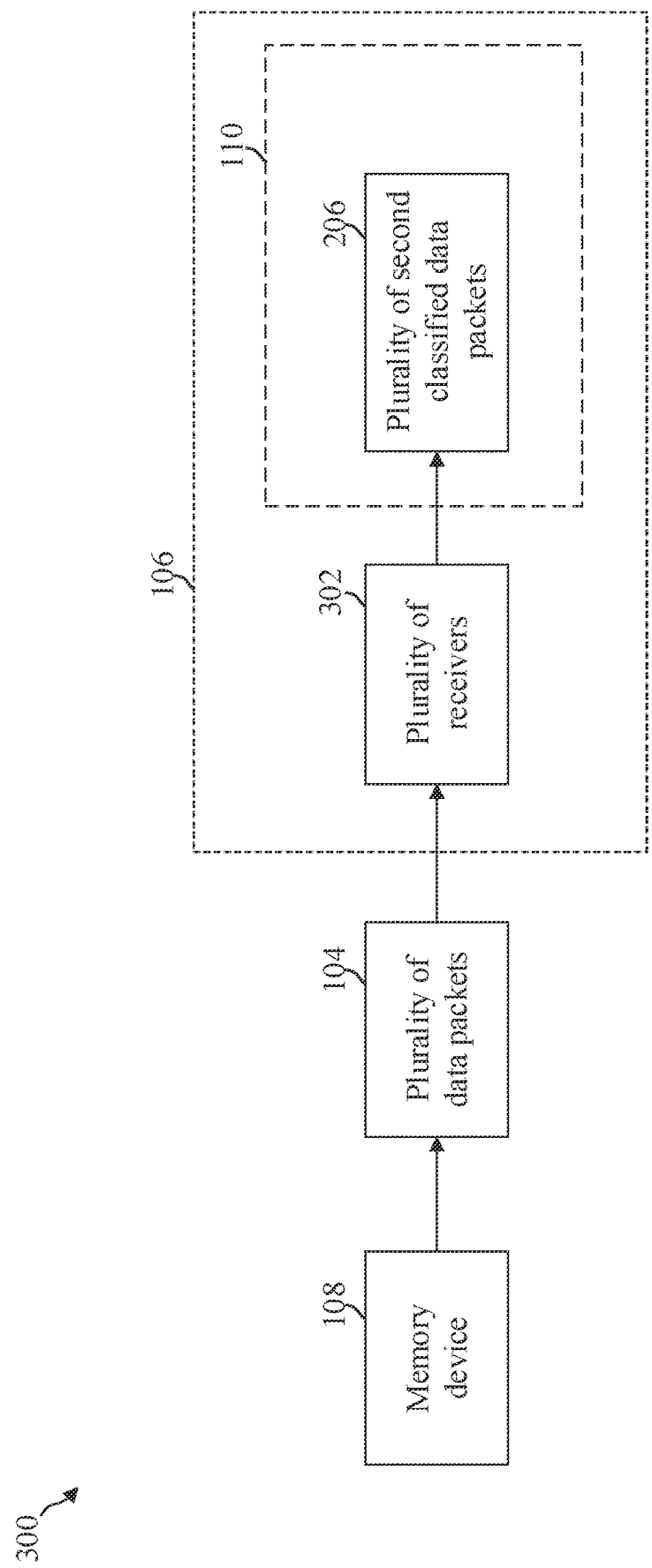
FIG. 3 shows a processing system for generating training data according to various embodiments.

FIG. 3 shows a processing system 300 for generating training data according to various embodiments. The processing system 300 may include the memory device 108. The memory device 108 may store the plurality of data packets 104, wherein the plurality of data packets 104 may be provided to the memory device 108 using the transmitting device 102 according to the system 100A or using the simulation model 114 according to the processing system 100B. The processing system 300 may further include the receiving device 106. The receiving device 106 may include the at least one processor 110. The receiving device 106 may further include a plurality of receivers 302, wherein each receiver of the plurality of receivers 302 may be configured to process data packets, such as the plurality of data packets 104. Processing a data packet by a receiver may include equalization, detection, and/or decoding (for example joint equalization, detection and decoding). The plurality of receivers 302 may be configured to provide the plurality of second classified data packets 206, wherein the plurality of second classified data packets 206 may be training data for training the model 202. According to various embodiments, the plurality of receivers 302 is configured to process the plurality of data packets 104 and the processor 110 may be configured to determine the plurality of second classified data packets 206 based on the processing of the plurality of data packets 104 performed by the plurality of receivers 302.

Each receiver of the plurality of receivers 302 may include a complexity level of a plurality of complexity level. A complexity level may describe a complexity of the architecture of the respective receiver. The complexity level of a receiver may depend on the amount of iterations needed for processing a data packet. The amount of needed operations may be based on multiplications (MULT) and additions (ADD). The more complex a receiver (i.e. a receiver architecture) is (i.e. the higher the complexity level of the receiver is) the higher is the power consumption and the delay of the receiver. Illustratively, a higher complexity receiver is for example capable to process, such as decode, weaker signals or more complex transmission channel parameters with respect to the data packets than a receiver having a lower complexity. In other words, illustratively, a receiver having a higher complexity is capable of processing more complex data packets with respect to a signal strength, a transmitted data pattern and/or channel characteristics.

According to various embodiments, each data packet of the plurality of data packets 104 requires a receiver of the plurality of receivers 302 with a minimum complexity level (i.e. complexity level above a lowest required complexity level) to be processed without an error. In other words, each receiver of the plurality of receivers 302 having a complexity level above the minimum complexity level is capable of processing a respective data packet without an error and the processing of a respective data packet by a receiver of the plurality of receivers 302 having a complexity level below the minimum complexity level leads to an error. In other words, a receiver of the plurality of receivers 302 having a complexity level below the minimum complexity level of a respective data packet may not be capable to process, for example to decode, the data packet.

Figure 4:
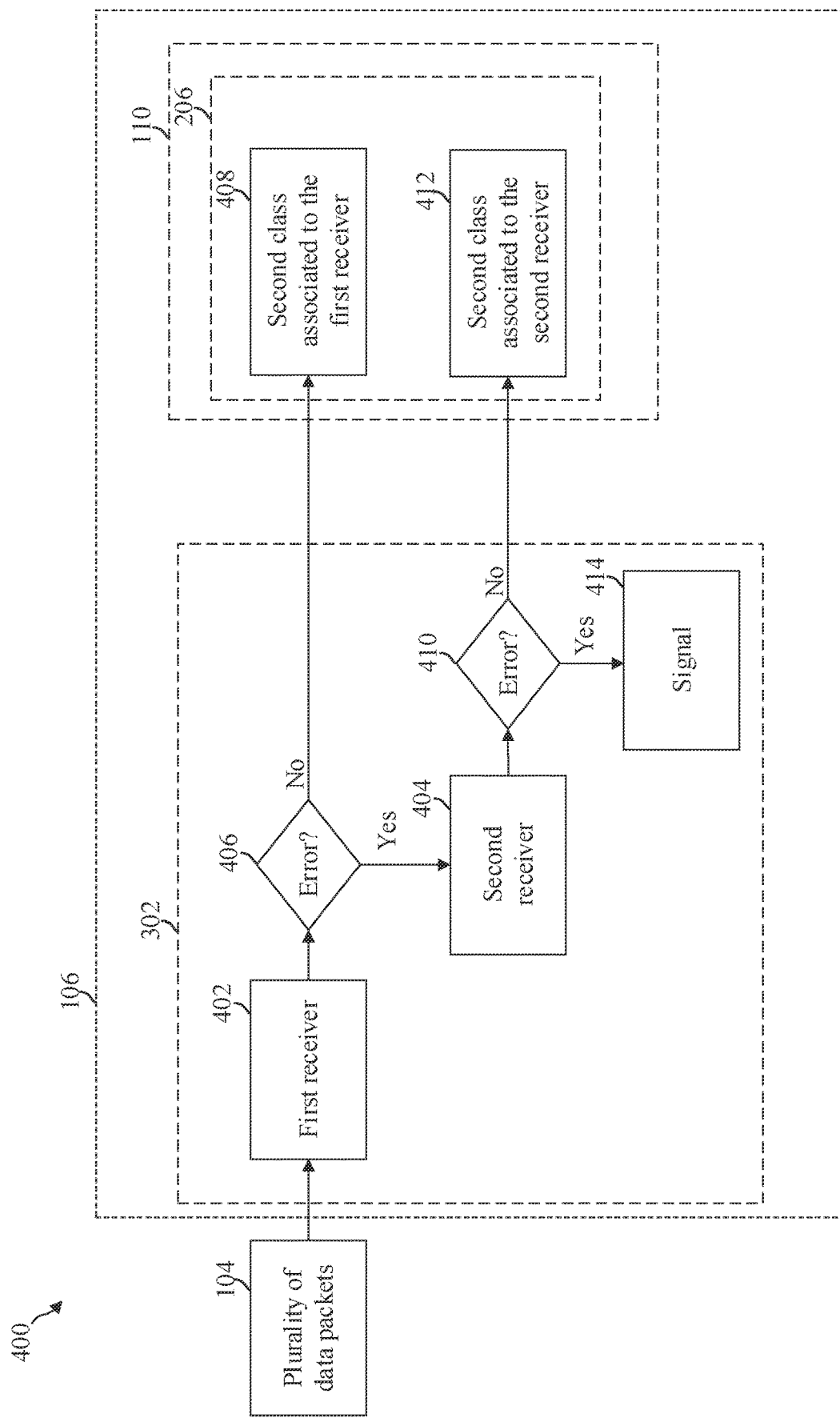
FIG. 4 shows a processing system for generating training data according to various embodiments.

FIG. 4 shows a processing system 400 for generating training data according to various embodiments. The processing system 400 may correspond substantially to the processing system 300, wherein the plurality of receivers 302 includes a first receiver 402 and a second receiver 404. The complexity level of the first receiver 402 may be lower than the complexity of the second receiver 404. Thus, illustratively, as described above, the second receiver 404 may be capable to process data packets having a higher complexity than the data packets the first receiver 402 is capable to process. The at least one processor 110 may be configured to generate the plurality of second classified data packets 206. The first receiver 402 may be configured to process each data packet of the plurality of data packets 104. An error status 406 may be determined based on the processing of a data packet by the first receiver 402. If the first receiver 402 processes a data packet of the plurality of data packets 104 without an error (in other words, is capable to process the data packet, i.e. error status 406 "No"), the second class 408 of the plurality of second classes associated to the first receiver 402 may be assigned to the respective data packet. In other words, the processor 110 may be configured to label the respective data packet with a second class 408 associated to the first receiver 402.

If the first receiver 402 generates an error while processing a data packet of the plurality of data packets 104 (in other words, is not capable to process the data packet, i.e. error status 406 "Yes"), the data packet may be provided to the second receiver 404 and the second receiver 404 may be configured to process the data packet.

An error status 410 may be determined based on the processing of the data packet by the second receiver 404. If the second receiver 404 processes the data packet without an error (in other words, is capable to process the data packet, i.e. error status 410 "No"), the second class 412 of the plurality of second classes associated to the second receiver 404 is assigned to the respective data packet. In other words, the processor 110 may be configured to label the respective data packet with a second class 412 associated to the second receiver 404.

If the second receiver 404 generates an error while processing the data packet (in other words, is not capable to process the data packet, i.e. error status 410 "Yes"), a signal 414 may be provided, for example outputted. The signal 414 may be a stop signal for stopping the processing of the respective data packet, or may be a warning signal that the respective data packet could not be processed.

According to various embodiments, the plurality of receivers 302 includes more the two receivers. The plurality of receivers 302 may be configured to process each data packet of the plurality of data packets 104 and the processor 110 may be configured to assign to each data packet a second class associated to a receiver of the plurality of receivers 302 including the minimum complexity level in order to process the respective data packet without an error. The plurality of receivers 302 may be configured to process each data packet of the plurality of data packets 104 successively starting with the receiver including the lowest complexity level. If the receiver including the lowest complexity level fails to process a data packet (i.e. generates an error), the receiver of the plurality of receivers 302 including the next lowest complexity level processes the respective data packet. The plurality of receivers 302 may be configured to continue processing a data packet successively using the receiver including the next lowest complexity level until a receiver of the plurality of receivers 302 processes the respective data packet without an error. The complexity level of the receiver, which processes the respective data packet without an error, may be the minimum complexity level of the data packet. In others words, the minimum complexity level for processing a data packet may be defined by the receiver, which processes the respective data packet without an error. The processor 110 may be configured to assign the second class associated to the receiver, which processes a data packet without an error, to the respective data packet. Thus, the plurality of receivers 302 may be configured to process each data packet of the plurality of data packets 104 and the processor 110 may be configured to assign a second class to each data packet of the plurality of data packets 104 depending on the processing performed by the plurality of receivers 302. If none of the receivers of the plurality of receivers 302 is capable to process a respective data packet without an error, a signal, such as the signal 414, may be provided, for example outputted. In other words, if the receiver of the plurality of receivers 302 having the highest complexity level generates an error while processing the data packet (in other words, is not capable to process the data packet, i.e. error status "Yes"), the signal may be provided.

According to various aspects, if none of the receivers of the plurality of receivers 302 is capable to process a respective data packet without an error (e.g., error status 410 "Yes"), a second class associated to the error indicator may be assigned to the respective data packet. In this case, each first class of the plurality of first classes except for one first class may be associated with a respective receiver of the plurality of receivers. For example, the one first class may be associated with an error indicator (e.g., a receiver-processing error) and the other first classes of the plurality of first classes may be bijectively assigned to a respective receiver of the plurality of receivers. With respect to FIG. 2, the processor 110 may be configured to train the model 202 such that the plurality of first classified data packets 204 generated by the model 202 corresponds to the plurality of second classified data packets 206. Thus, the model 202 learns to assign a class, which is associated with a receiver of the plurality of receivers or with the error indicator, to a data packet considering the data packet parameters, such as properties of a transmitted data pattern and channel characteristics, and considering receiver algorithms. Illustratively, the trained model may be configured to classify a received data packet by assigning a class to the data packet, wherein the class indicates either, which receiver of the plurality of receivers is capable to process the data packet without an error (e.g., if the class is associated with a receiver of the plurality of receivers), or that none of the receivers is capable to process the data packet without an error (e.g., if the class is associated with the error indicator).

Figure 5:
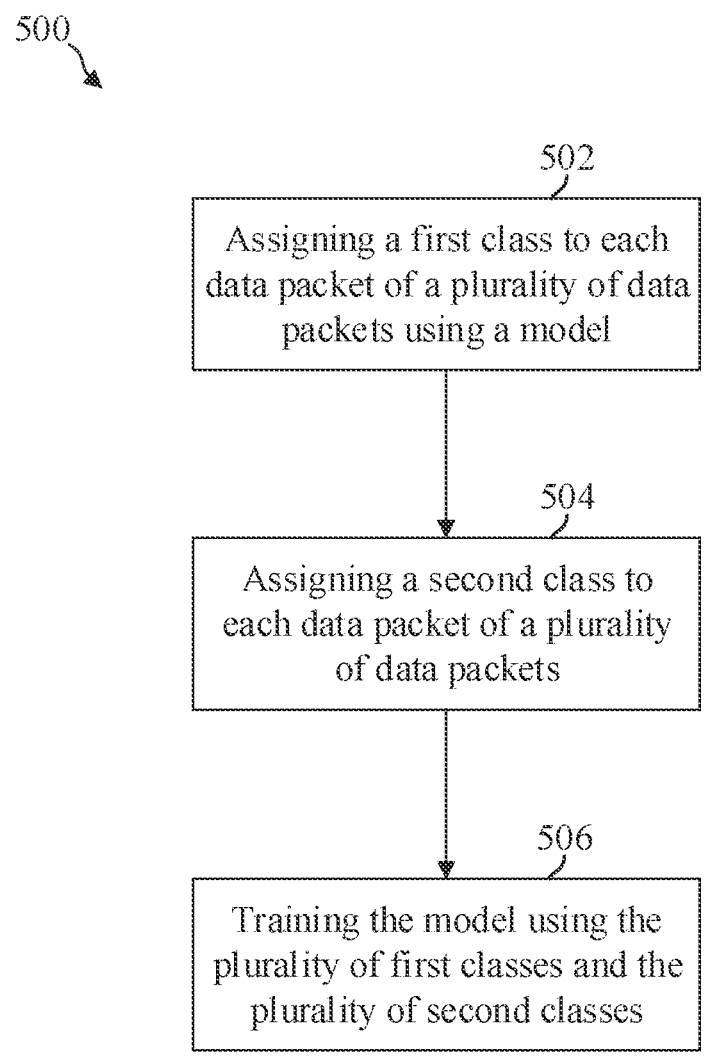
FIG. 5 shows a method for training a model according to various embodiments.

FIG. 5 shows a method 500 for training a model according to various embodiments. The method 500 may include a first classifying of a plurality of data packets 104 using the model 202 (in 502). The model 202 may assign a first class of a plurality of first classes to each data packet of the plurality of data packets 104, wherein the first class may be associated with a receiver of a plurality of receivers 302. In other words, a plurality of first classified data packets 204 may be generated, wherein each data packet of the plurality of data packets 104 is labeled with a first class.

The method 500 may further include a second classifying of the plurality of data packets 104 (in 504), wherein a second class of a plurality of second classes may be assigned to each data packet of the plurality of data packets 104. The second class may be associated with a receiver of the plurality of receivers 302. In other words, a plurality of second classified data packets 206 may be generated, wherein each data packet of the plurality of data packets 104 is labeled with a second class.

The method 500 may further include training the model 202 using the plurality of first classes and the plurality of second classes. In other words, the model 202 may be trained using the plurality of first classified data packets 204 and the plurality of second classified data packets 206. The model 202 may be trained by comparing the plurality of first classified data packets 204 with the plurality of second classified data packets 206. In other words, the model 202 may be trained by comparing the first class assigned to each data packet of the plurality of data packets 104 with the second class assigned to the respective data packet. The model 202 may be adapted such that the first class assigned to each data packet of the plurality of data packets 104 corresponds to the second class of the respective data packet.

For example, the first class and the second class associated to a receiver may be numbers. In others words, the model 202 may be configured to assign a first class including a first number to a data packet, wherein the first number may be associated to a receiver, such as the first number "1" for a first receiver, the first number "2" for a second receiver etc. The second classifying may include assigning a second class including a second number to a data packet, wherein the number may also be associated to a receiver, such as the second number "1" for a first receiver, the second number "2" for a second receiver etc.

The second class assigned to a data packet may be training data for the data packet. Training the model 202 may include comparing the first class, i.e. the first number, with the second class, i.e. the second number, assigned to a data packet. Training the model 202 may further include adapting the model 202 such that the first class, i.e. the first number, assigned to a data packet corresponds to the second class, i.e. the second number, of the data packet. Illustratively, the training data (plurality of second classes) may include a number associated to a receiver of a plurality of receivers and the model 202 is trained to assign the number, given by the training data, to the data packet.

Figure 6:
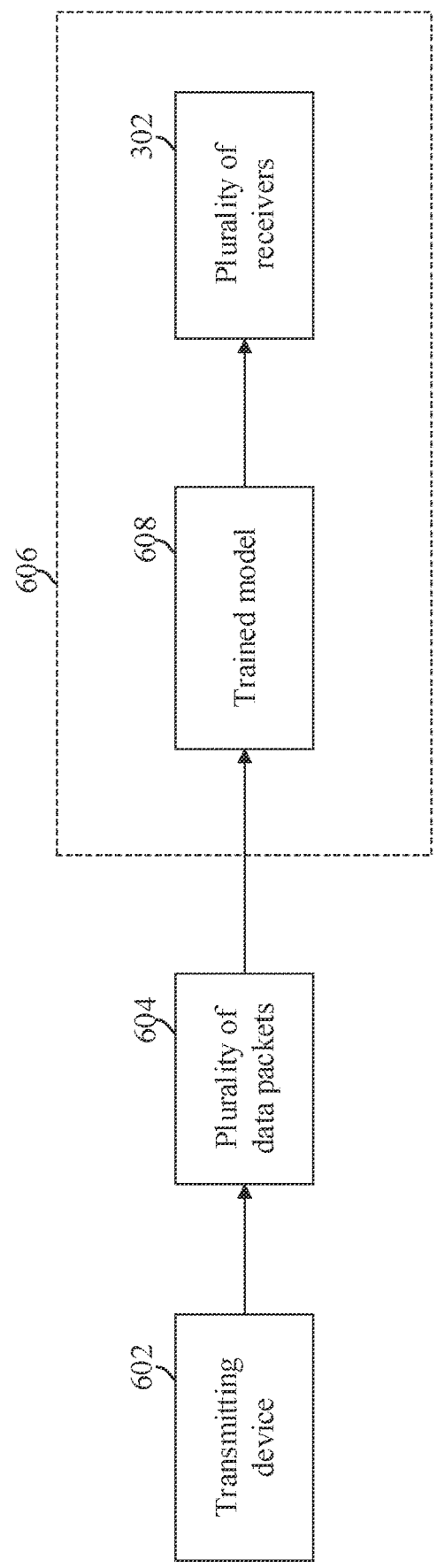
FIG. 6 shows a system including a trained model according to various embodiments.

FIG. 6 shows a system 600 including a trained model according to various embodiments. The system 600 may include a transmitting device 602. The transmitting device 602 may correspond to the transmitting device 102. The transmitting device 602 may be configured to provide, for example to transmit, a plurality of data packets 604. The transmission properties of the plurality of data packets 604 may correspond substantially to the transmission properties of the plurality of data packets 104. The system 600 may further include a receiving device 606. The receiving device 606 may be configured to receive the plurality of data packets 604. According to various embodiments, the transmitting device 602 is configured to transmit the plurality of data packets 604 wirelessly, for example via a wireless communication channel, such as a radio frequency (RF) communication channel, and the receiving device 606 is configured to receive the plurality of data packets 604 wirelessly from the transmitting device 602. The receiving device 606 may include the plurality of receivers 302, wherein the plurality of receivers 302 may be configured to process data packets. The system 600 may be a multiple input multiple output (MIMO) system, i.e. the transmitting device 602 may include a plurality of transmitters for transmitting data packets and the receiving device 606 may include the plurality of receivers 302 for receiving data packets.

The receiving device 606 may include a trained model 608. Thus, the receiving device 606 may include at least one processor such as the processor 110, and the at least one processor may implement the trained model 608. The trained model 608 may be trained by the method 500 for training a model. The trained model 608 may be configured to classify each data packet of the plurality of data packets 604, wherein a class is assigned to each data packet and wherein the class is associated with a receiver of the plurality of receivers 302. In other words, the trained model 608 may be trained such that the trained model 608 selects a receiver of the plurality of receivers 302 for a data packet, for example for each data packet of the plurality of data packets 604, wherein the trained model 608 may select a receiver of the plurality of receivers 302 having the minimum complexity level required for the respective data packet. In even other words, the trained model 608 may be configured to assign a receiver of the plurality of receivers 302 to a data packet and the assigned receiver may process the data packet.

The at least one processor of the receiving device 606 may be configured to estimate a processing time and/or a processing cost based on the classification of the plurality of data packets 604. The at least one processor of the receiving device 606 may be configured to estimate the processing time and/or the processing cost based on the classification of the plurality of data packets 604 before processing the plurality of data packets 604 by the plurality of receivers 302, i.e. before processing each data packet of the plurality of data packets 604 by the assigned receiver of the plurality of receivers 302. For example, the at least one processor estimates a processing time for each receiver of the plurality of receivers and total processing time by multiplying the processing time for each receiver with the number of data packets of the plurality of data packets 604, which are assigned to the respective receiver by the trained model 608.

FIG. 7 shows a receiving device 700 including a trained model according to various embodiments. The receiving device 700 may correspond substantially to the receiving device 606, wherein the plurality of receivers 302 included in the receiving device 700 include a selector 702 as well as at least a first receiver 704 and at least a second receiver 706. The selector 702 may be configured to select a receiver of the plurality of receivers 302, for example the first receiver 704 or the second receiver 706, for a data packet of the plurality of data packets 604 using the class assigned to a respective data packet by the trained model 608. The first receiver 704 and the second receiver 706 may be arranged parallel to each other. In other words, a data packet may be provided to a receiver of the plurality of receivers 302 by the selector 702. Thus, for example, either the first receiver 704 or the second receiver 706 may be selected for processing the respective data packet.

The invention claimed is:

1. A method of computer-implemented training a model, the method comprising:
   first classifying a plurality of data packets using the model, wherein a first class is assigned to each data packet of a plurality of data packets, wherein the first class is associated with a receiver of a plurality of receivers, wherein each receiver of the plurality of receivers comprises a complexity level of a plurality of complexity levels, and wherein each data packet of the plurality of data packets requires a receiver of the plurality of receivers with a minimum complexity level to be processed without an error;
   second classifying the plurality of data packets, wherein a second class is assigned to each data packet of the plurality of data packets, wherein the second class is associated with a receiver of the plurality of receivers, wherein the second classifying comprises: processing each data packet of the plurality of data packets using the plurality of receivers by successively starting with the receiver comprising the lowest complexity level and continuing with the receiver comprising the next lowest complexity level until a receiver of the plurality of receivers processes the respective data packet without an error, wherein the complexity level of the receiver, which processes the respective data packet without an error, is the minimum complexity level, and assigning to each data packet of the plurality of data packets the second class associated to a receiver of the plurality of receivers comprising the minimum complexity level; and training the model using the plurality of first classes and the plurality of second classes assigned to the plurality of data packets.

2. The method of claim 1, wherein the plurality of data packets comprises communication data.

3. The method of claim 1, wherein each data packet of the plurality of data packets comprises In-phase/Quadrature data.

4. The method of claim 1, wherein training the model comprises adapting the model by comparing the first class with the second class assigned to each data packet of the plurality of data packets.

5. The method of claim 4, wherein training the model further comprises adapting the model such that the first class assigned to each data packet of the plurality of data packets corresponds to the second class.

6. The method of claim 1, wherein the model is a neural network.

7. A receiving device, configured to perform the method of claim 1.

8. A data reception method, comprising:
classifying a plurality of data packets using a model trained by the method of claim 1, wherein a class is assigned to each data packet of the plurality of data packets and wherein the class is associated with a receiver of a plurality of receivers;
processing each data packet of the plurality of data packets using the receiver of the plurality of receivers associated to the respective class of the plurality of classes.

9. The data reception method of claim 8, further comprising: estimating a processing time and/or processing cost based on the classification of the plurality of data packets before processing the plurality of data packets.

10. A system, comprising:
a receiving device comprising a model trained by the method of claim 1, the receiving device configured to receive and to process data packets;
at least one transmitter device, configured to transmit data packets to the receiving device.

11. The system of claim 10, wherein the system is a multiple input multiple output (MIMO) system.

12. A method of computer-implemented training a model, the method comprising:
first classifying a plurality of data packets using the model, wherein a first class is assigned to each data packet of a plurality of data packets, wherein the first class is associated with a receiver of a plurality of receivers, wherein each receiver of the plurality of receivers comprises a complexity level of a plurality of complexity levels, and wherein each data packet of the plurality of data packets requires a receiver of the plurality of receivers with a minimum complexity level to be processed without an error;
second classifying the plurality of data packets, wherein a second class is assigned to each data packet of the plurality of data packets, wherein the second class is associated with a receiver of the plurality of receivers, wherein the second classifying comprises:
processing each data packet of the plurality of data packets to determine the respective receiver with the minimum complexity level required to process the respective data packet without an error, wherein the processing comprises processing the respective data packet by a first receiver comprising a first complexity level and, in the case that the first receiver generates an error, processing the data packet by a second receiver comprising a second complexity level higher than the first complexity level; and
assigning to each data packet of the plurality of data packets the second class associated to the respectively determined receiver comprising the minimum complexity level; and
training the model using the plurality of first classes and the plurality of second classes assigned to the plurality of data packets.

13. The method according to claim 12, wherein the first complexity level is the lowest complexity level.

14. The method according to claim 12:
wherein, in the case that the second receiver generates an error, processing the respective data packet to determine the receiver with the minimum complexity level further comprises processing the data packet by a third receiver comprising a third complexity level higher than the second complexity level.

15. The method according to claim 12:
wherein, in the case that the second receiver does not generate an error, the second complexity level is the minimum complexity level.

* * * * *